United States Patent
Roberts et al.

(10) Patent No.: US 6,991,723 B2
(45) Date of Patent: *Jan. 31, 2006

(54) UNDERDRAIN SYSTEM

(75) Inventors: R. Lee Roberts, Chadds Ford, PA (US); Mark Kevin Addison, Bear, DE (US)

(73) Assignee: RG Delaware, Inc., Wilmington, DE (US)

( * ) Notice: Subject to any disclaimer, the term of this patent is extended or adjusted under 35 U.S.C. 154(b) by 69 days.

This patent is subject to a terminal disclaimer.

(21) Appl. No.: 10/400,575

(22) Filed: Mar. 28, 2003

(65) Prior Publication Data

US 2004/0031743 A1 Feb. 19, 2004

Related U.S. Application Data

(63) Continuation-in-part of application No. 09/948,798, filed on Sep. 10, 2001.

(51) Int. Cl.
*B01D 24/38* (2006.01)

(52) U.S. Cl. .................. 210/232; 210/289; 210/291; 210/293

(58) Field of Classification Search .............. 210/289, 210/291, 293, 232
See application file for complete search history.

(56) References Cited

U.S. PATENT DOCUMENTS

| | | | |
|---|---|---|---|
| 4,619,765 A | 10/1986 | Roberts .................... 210/289 |
| 5,019,259 A | 5/1991 | Hambley ................... 210/274 |
| 5,028,322 A | * 7/1991 | Soriente .................... 210/232 |
| 5,108,627 A | 4/1992 | Berkebile et al. .......... 210/793 |
| 5,149,427 A | 9/1992 | Brown et al. ............. 210/274 |
| 5,269,920 A | 12/1993 | Brown et al. ............. 210/274 |
| 5,462,664 A | 10/1995 | Neuspiel .................... 210/274 |
| 5,489,388 A | 2/1996 | Brown et al. ............. 210/794 |
| 6,110,366 A | * 8/2000 | Hunkele et al. ............ 210/232 |
| 6,190,568 B1 | 2/2001 | Hunkele .................... 210/767 |
| 6,325,931 B1 | 12/2001 | Roberts et al. ............. 210/293 |
| 6,569,327 B2 | 5/2003 | Roberts et al. ............. 210/274 |
| 6,615,469 B1 | * 9/2003 | Burcham ................... 29/401.1 |

FOREIGN PATENT DOCUMENTS

| | | |
|---|---|---|
| EP | 0507414 A2 | 10/1992 |
| FR | 541011 | 7/1922 |

OTHER PUBLICATIONS

"Water Marks," pp. 1 and 2; Jan. 1995.
"Retroliner™ Rehabilitation System for Monolithic Wheeler Underdrains Product Specifications." pp. 1 and 2.
"Gravity Filter Underdrain," Jan. 1981.
"Infinity Continuous Lateral Underdrain" 1999.
WO 99/47232, Method for Using a Gravity Filter, Sep. 23, 1999.
WO 97/40907, Fluid Treatment Media Support System, Nov. 6, 1997.
Office action dated Apr. 6, 2005 issued in Ecuadorian Patent Application No. SP 02–4313.
Co–pending U.S. Appl. No. 11/119,907 filed on May 3, 2005.

* cited by examiner

*Primary Examiner*—Ivars C. Cintins
(74) *Attorney, Agent, or Firm*—Merek, Blackmon & Voorhees, LLC

(57) ABSTRACT

An underdrain system having a bottom formed of concrete. The concrete bottom includes a plurality of depressions formed therein. A porous plate is operably associated with at least one of the depressions. An anchor assembly is provided for anchoring the porous plate to the concrete bottom in an efficient and cost effective manner. Preferably, the anchor assembly permits the porous plate to be readily replaced. An optional insert may be used to enhance the distribution of the flow of fluid through the porous plate.

20 Claims, 6 Drawing Sheets

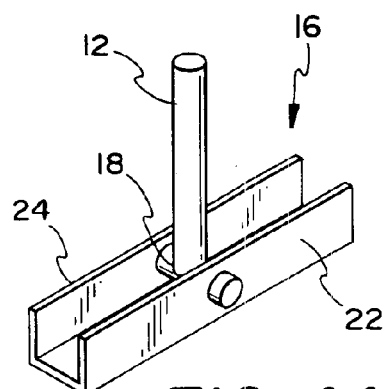
FIG. 4A
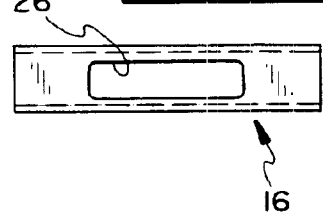
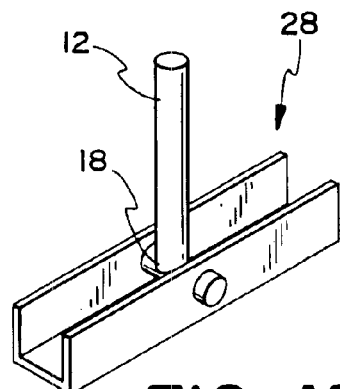
FIG. 4B
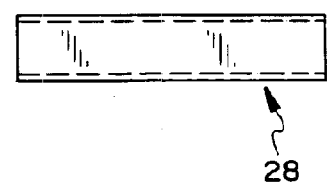
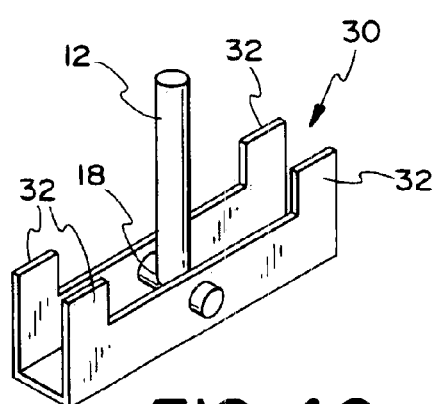
FIG. 4C
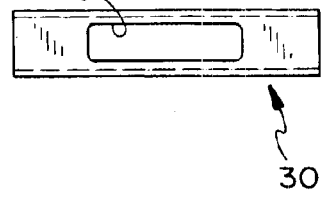
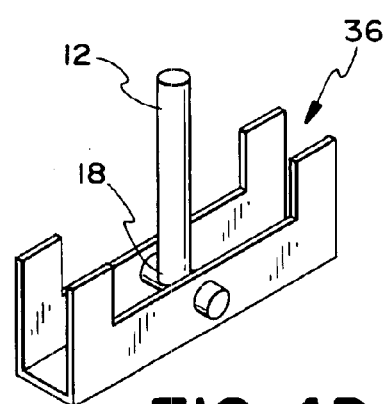
FIG. 4D
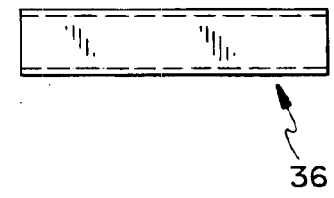

UNDERDRAIN SYSTEM

RELATED APPLICATIONS

The subject patent application is a continuation-in-part of U.S. patent application Ser. No. 09/948,798 filed on Sep. 10, 2001, the entire contents of which are incorporated herein by reference.

FIELD OF THE INVENTION

The present invention is directed to significant improvements to underdrain systems generally and in particular false bottom (e.g., pre-cast and/or monolithic) underdrain systems that are used in filter systems for filtering water or wastewater.

BACKGROUND OF THE INVENTION

Various underdrain systems have been developed for filter systems that filter water and wastewater. One commonly used underdrain system is a monolithic false bottom underdrain system. This underdrain system typically includes a cast in place concrete structure that overlays the structural floor or true bottom of the filter housing or compartment. The concrete structure includes a plurality of cone shaped depressions formed herein. "Cone shaped" as used herein includes within its definition pyramidal shaped depressions. A thimble is disposed at the lowermost point of the cone shaped depressions. Fluid flows through the thimble and corresponding cone shaped depressions during the various cycles of operation of a filter including the filtration mode and backwashing mode. Fourteen porcelain spheres are commonly disposed in each of the cone shaped depressions. Five of the porcelain spheres are approximately 3 inches in size, one of the porcelain spheres is approximately 1⅜ inches in size and the eight remaining porcelain spheres are approximately 1¼ inches in size. One of the 3 inch porcelain spheres is disposed directly over a porcelain thimble positioned in the bottom of the cone shaped depressions. The remaining four 3 inch balls are disposed directly above the porcelain sphere positioned over the thimble. The 1⅜ inch porcelain sphere is located in the center of the four 3 inch porcelain spheres. The remaining eight 1¼ inch porcelain spheres are positioned on the outer periphery of the four 3 inch porcelain spheres. The porcelain balls are expensive and time-consuming to install. Further, it is important to insure that the balls are spherical to insure that the balls do not spin owing to the flow of water passing the balls. This spinning can cause undue wear on the walls of the depressions. The porcelain balls are also subject to becoming dislodged from the corresponding depression. This can lead to significant problems with the operation of the filter.

Another commonly employed underdrain system is a pre-cast wheeler bottom. This type of underdrain system is typically shipped in blocks of specific sizes such as 2'×2' as opposed to a monolithic false bottom underdrain system as previously described. The pre-cast blocks are positioned on concrete walls in the filter housing or compartment. A plurality of depressions are formed in the pre-cast blocks. A plurality of porcelain spheres are disposed in each of the depressions. This underdrain system suffers from similar drawbacks to the monolithic false bottom underdrain systems.

A pyramidal shaped liner has been employed in the depressions of the concrete bottoms where the walls have deteriorated. However, this pyramidal shaped liner formed from plastic only addressed the structural deficiency of the walls and still required the use of numerous porcelain spheres or balls.

U.S. Pat. No. 6,190,568 discloses retrofitting a monolithic false bottom filter underdrain system by replacing the porcelain balls with one or more porous plates. The primary if not exclusive reason for substituting the porcelain balls with a porous plate stated in U.S. Pat. No. 6,190,568 is to obviate one or more gravel support layers that are sometimes used with monolithic false bottom underdrain systems. The porous plates are permanently anchored to the concrete bottom of the monolithic false bottom underdrain system. Specifically, U.S. Pat. No. 6,190,568 teaches permanently anchoring the porous plates to the concrete bottom by embedding an anchor in the concrete bottom.

There are numerous disadvantages to the retrofit underdrain system disclosed in U.S. Pat. No. 6,190,568. One principal disadvantage is that the porcelain balls are replaced with an inferior fluid distributor. Specifically, unlike the porcelain balls, porous plates are not particularly good distributors. This causes significant problems during operation of the filter. For example, fluid directed through a porous plate is more likely to pass through the central portion of the porous plate rather than be evenly distributed over the entire surface area of the porous plate. This results in maldistribution of the fluid in the filter bed. The retrofit underdrain system disclosed in U.S. Pat. No. 6,190,568 employs multiple layers of porous plates to achieve better distribution. However, adequate distribution is not achieved owing to limitations on the distribution capabilities of the porous plate. Further, using multiple porous plates unnecessarily increases the cost of the retrofit underdrain system. The retrofit underdrain system disclosed in U.S. Pat. No. 6,190,568 is unnecessarily difficult and time consuming to install. Specifically, embedding the anchoring members in concrete to permanently secure the porous plate to the concrete bottom is a difficult and time-consuming process due in part to the presence of reinforcing steel used in the concrete. The difficulty in the installation process can lead to structural failure. Moreover, the porous plate cannot be readily replaced when necessary owing to its permanent attachment to the concrete bottom.

OBJECTS AND SUMMARY OF THE INVENTION

An object of the present invention is to provide a novel and unobvious underdrain system.

Another object of a preferred embodiment of the present invention is to provide a method for readily retrofitting a false bottom underdrain.

A further object of a preferred embodiment of the present invention is to provide a kit for permitting an existing false bottom underdrain to be readily modified to omit the porcelain spheres while simultaneously insuring thorough distribution of the fluid through a filter bed.

Yet another object of a preferred embodiment of the present invention is to provide a new underdrain installation with a configuration that omits porcelain spheres.

Still another object of a preferred embodiment of the present invention is to provide an anchoring member for anchoring a porous plate to the concrete bottom of a false bottom underdrain system without penetrating any surface of the concrete bottom.

Yet still another object of a preferred embodiment of the present invention is to provide an anchoring assembly for removably anchoring a porous plate to the concrete bottom of a false bottom underdrain system thereby permitting rapid removal of the porous plate when necessary to replace the same.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one embodiment of the present invention is directed to an underdrain system including a bottom having a plurality of depressions formed therein. The underdrain system of this embodiment further includes a porous plate. The porous plate is operably associated with at least one of the plurality of depressions. A removable anchor assembly is provided for removably anchoring the porous plate to the bottom. At least a portion of the removable anchor assembly extends through the porous plate.

Another embodiment of the present invention is directed to an underdrain system including a bottom having a plurality of depressions formed therein. The underdrain system of this embodiment further includes a porous plate. The porous plate is operably associated with at least one of the plurality of depressions. A removable anchor is provided for removably anchoring the porous plate to the bottom. At least a first portion of the removable anchor is moveable between a first position and a second position.

A further embodiment of the present invention is directed to an underdrain system including a bottom having a plurality of depressions formed therein. The underdrain system further includes a porous plate operably associated with at least one of the plurality of depressions. An anchor assembly is provided for anchoring the porous plate to the bottom. At least a portion of the anchor assembly extends into one of said plurality of depressions of the bottom.

Still another embodiment of the present invention is directed to an underdrain system including a bottom having an upper surface and a lower surface. The bottom further includes a plurality of depressions formed therein. The depressions extend between the upper surface and the lower surface. The underdrain system of this embodiment further includes a porous plate operably associated with at least one of the plurality of depressions. An anchor assembly is provided for anchoring the porous plate to the bottom. At least a portion of the anchor assembly is disposed below the lower surface of the bottom.

BRIEF DESCRIPTION OF THE DRAWINGS

FIGS. 4A to 4D are fragmentary perspective views of four different configurations of a portion of an anchor formed in accordance with the present invention Numerous other configurations may be employed within the scope of the invention.

DETAILED DESCRIPTION OF THE PREFERRED EMBODIMENTS OF THE INVENTION

The preferred forms of the invention will now be described with reference to FIGS. 1–8. The appended claims are not limited to the preferred forms and no term used herein is to be given a meaning other than its ordinary meaning unless it is expressly stated that the term shall have a special meaning. The only term in this Specification having a special meaning is the term "insert." As used herein "insert" does not include within its meaning a porous plate, i.e., a porous plate is not an insert.

Figure 1:
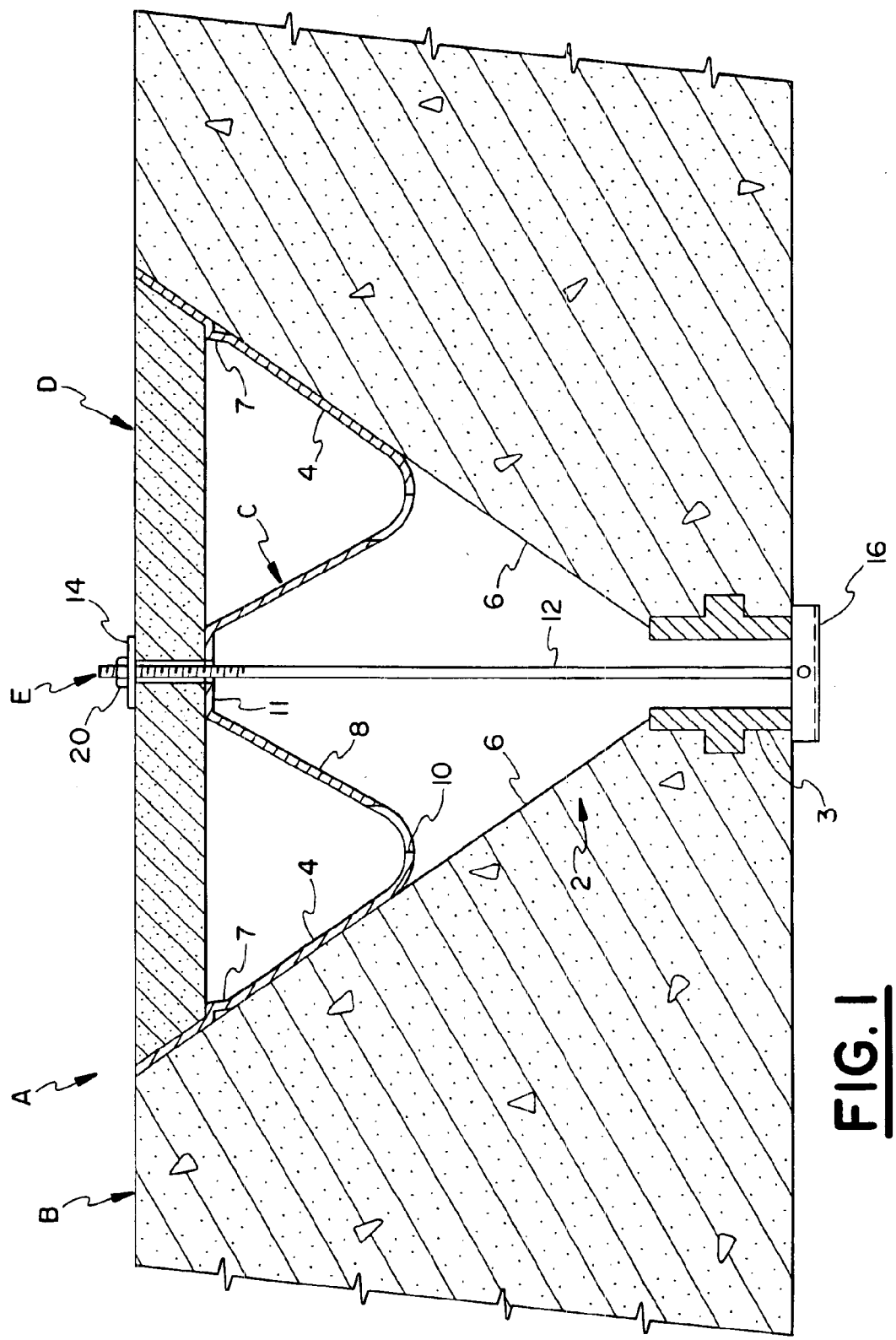
FIG. 1 is a cross-sectional view of a first preferred embodiment of the present invention.
Figure 2:
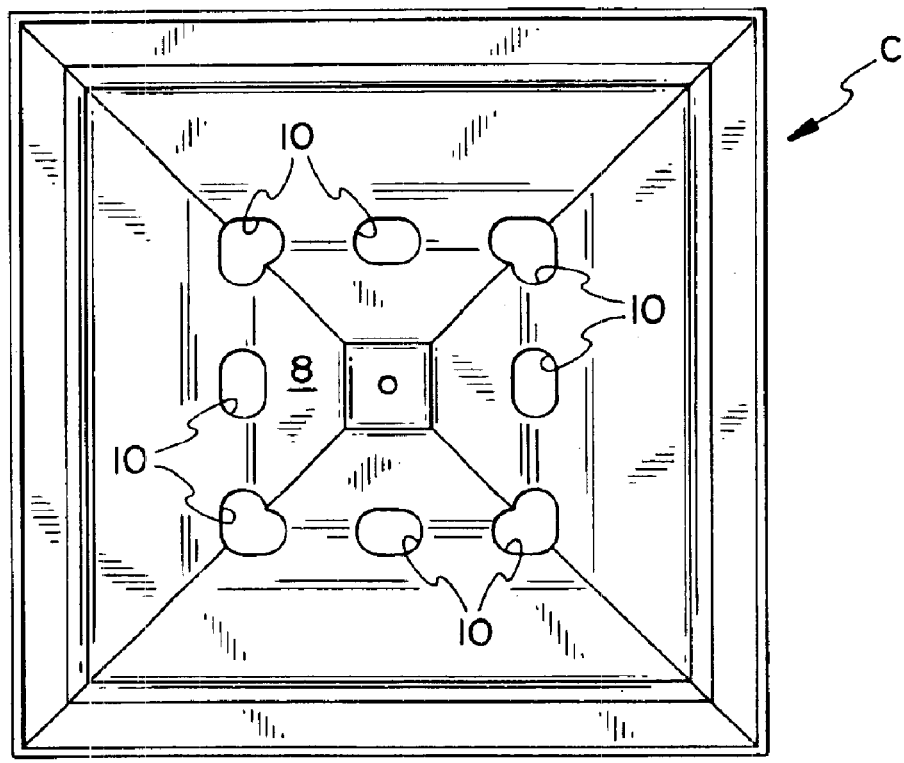
FIG. 2 is a plan view of the insert depicted in FIG. 1.
Figure 3:
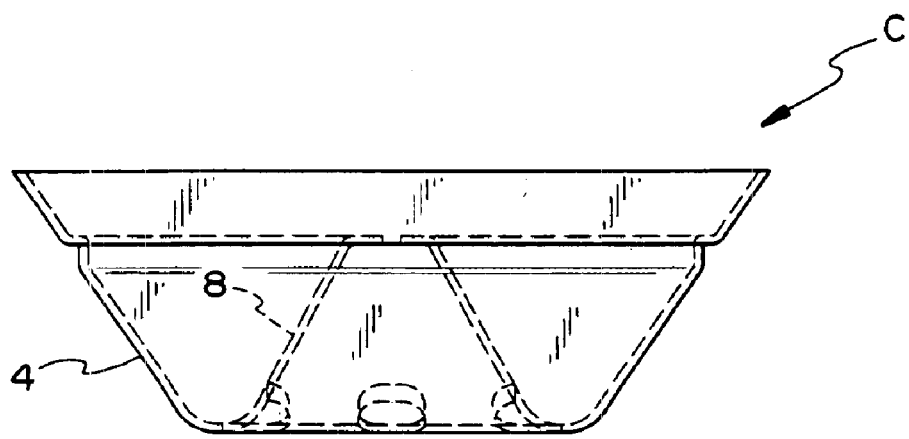
FIG. 3 is a side view of the insert depicted in FIG. 1.

FIGS. 1 Through 3

Referring to FIG. 1, a portion of an underdrain system A is illustrated in one of many possible configurations. The underdrain system A includes a false-bottom underdrain structure B. The false bottom filter underdrain structure B is preferably formed of concrete and includes a plurality of hoppers 2 (only one of which is shown). The false bottom underdrain structure B can either be of the pre-cast or monolithic construction. Where the false bottom underdrain structure B is of the pre-cast type, the underdrain structure will typically include one or more underdrain blocks. The number of underdrain blocks will vary depending on the size of a given filter.

The underdrain system A further includes a plurality of optional distribution inserts C (only one of which is shown), a plurality of porous plates D (only one of which is shown) and a plurality of anchor assemblies E. Preferably, there is one distribution insert C, one porous plate D and one anchor assembly E for each depression in the filter underdrain structure B. It should be noted that the porous plate D may be replaced with other particle retaining plates such as a strainer plate, a plate made of wedgewire or a plate made of any other suitable material to support gravel, sand, anthracite, garnet and or any other suitable material.

Preferably, the underdrain hoppers 2 are generally cone shaped. However, it will be readily appreciated that any suitable configuration may be used. Referring to FIG. 1, a thimble 3 is disposed at the lowermost portion of each of the hoppers 2. In a retrofit application, hoppers 2 originally have a plurality of porcelain spheres (not shown) disposed therein. During the process of retrofitting the false bottom underdrain structure B, all of the porcelain spheres and support gravel are removed. It should be noted that the present invention is not limited to retrofit applications but rather encompasses original installations as well. Once the porcelain spheres are removed, the distribution inserts C are positioned in the hoppers 2 such that the exterior walls 4 of distribution insert C engage the inner walls 6 of the hoppers 2. Exterior walls 4 preferably include a step 7 to support the porous plate D. Preferably, a conventional sealant is applied to provide a fluid tight seal between the insert C and the hopper 2.

Referring to FIGS. 1 to 3, distribution insert C has an inner wall 8 having a plurality of distribution orifices 10. It should be noted that the distribution orifices 10 can be of any configuration including but not limited to circular. The distribution orifices 10 enhance the distribution of fluid through the porous plate D. The inner wall 8 and ledge 11 support the porous plate D.

The anchor assembly E acts to secure the porous plate D and the insert C to the underdrain structure B. The anchor assembly E preferably includes a bolt or rod 12, a washer 14 and a retaining member 16. Various forms of the retaining member are illustrated in FIGS. 4A to 4D. It will be readily appreciated that numerous other configuration may be employed.

Referring to FIG. 4A, the retaining member 16 is pivotally connected to the lower end 18 of the bolt 12. As seen in FIG. 4A, the end 18 is substantially T-shaped. A nut 20 secures the upper end of the bolt or rod 12 about the porous plate D.

The ends of the T-shaped member 18 extend into openings in the sidewalls 22 and 24 of the retaining member 16. This arrangement allows the retaining member 16 to pivot relative to the bolt 12. This allows the anchor assembly E as well as the porous plate D to be readily secured to and detached from the underdrain structure B. Specifically, prior to insertion of the retaining member 16 through the bore of the thimble 3, the retaining member 16 is pivoted to a substantially vertical position. In this position, the retaining member 16 is free to pass through the bore of the thimble 3. When the retaining member 16 occupies the horizontal position depicted in FIG. 1, the anchor assembly E acts to secure the porous plate D to the underdrain structure E. To remove the porous plate D from the underdrain structure B, the nut 20 is loosened from the bolt 12, the retaining member 16 swings to the vertical position so that it can pass through the bore of the thimble 3 and the porous plate D is free to be removed and discarded.

The retaining member 16 preferably has an opening 26 formed in its bottom wall. Opening 26 improves the flow of fluid through the thimble 3. As is readily evident from the retaining member 28 depicted in FIG. 4B, the opening 26 is optional. Retaining member 30 depicted in FIG. 4C has four legs 32 that abut the bottom of the thimble when the anchor assembly is installed. The legs 32 further improve the flow of fluid through the thimble 3. An opening 34 is preferably formed in the bottom wall for the same reason as discussed in connection with opening 26. Opening 34 is optional as is evident from the retaining member 36 depicted in FIG. 4D.

Figure 5:
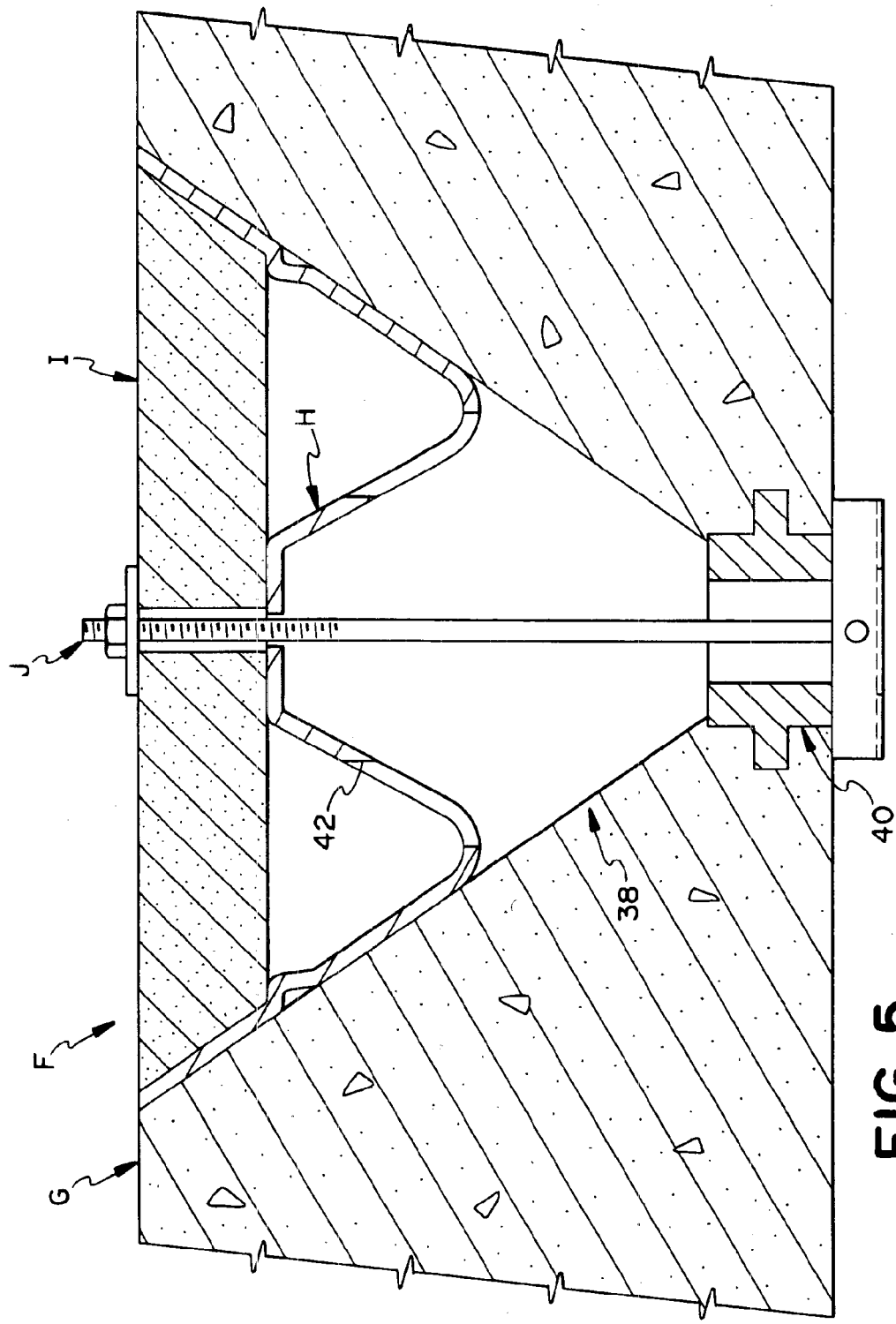
FIG. 5 is a cross-sectional view of a second preferred embodiment of the present invention.
Figure 6:
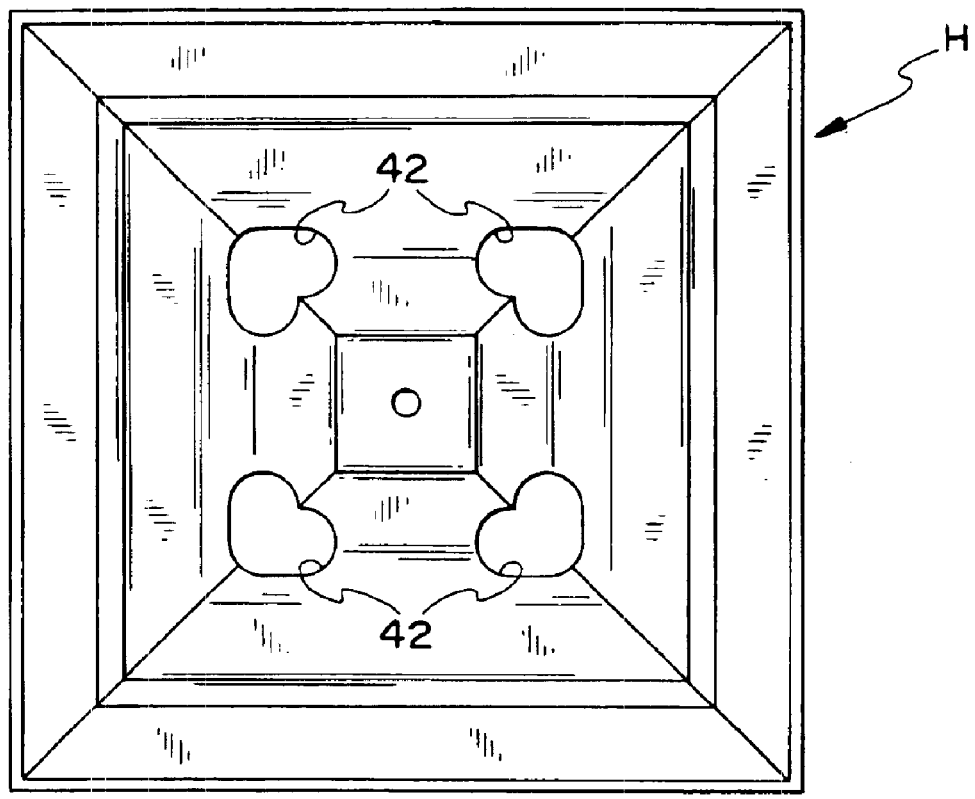
FIG. 6 is a plan view of the insert depicted in FIG. 5.
Figure 7:
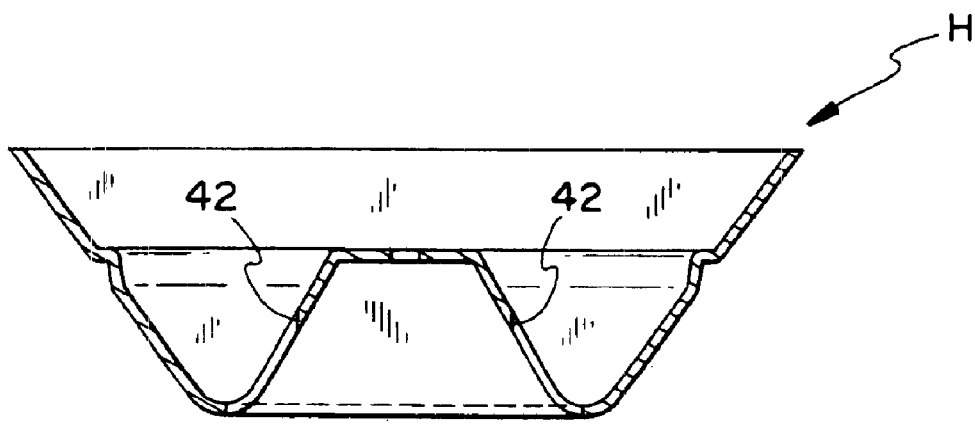
FIG. 7 is a side view of the insert depicted in FIG. 5.

FIGS. 5 to 7

Referring to FIGS. 5 to 7, one of many possible alternative arrangements will now be described. The underdrain system F includes a false bottom underdrain structure G. The false bottom filter underdrain structure G is preferably formed of concrete and includes a plurality of hoppers 38 (only one of which is shown). The false bottom underdrain structure G can either be of the pre-cast or monolithic construction. Where the false bottom underdrain structure G is of the pre-cast type, the underdrain structure will typically include one or more underdrain blocks. The number of underdrain blocks will vary depending on the size of a given filter.

The underdrain system F further includes a plurality of optional distribution inserts H (only one of which is shown), a plurality of porous plates I (only one of which is shown) and a plurality of anchor assemblies J. Preferably, there is one distribution insert H, one porous plate I and one anchor assembly J for each depression in the filter underdrain structure G. A thimble 40 is disposed in the lowermost portion of the hopper 38. The differences between this embodiment and that depicted in FIGS. 1 to 3 lies in the configuration of the thimble 40 (See FIG. 5) and the size and the number of opening 42 formed in the insert H (See FIGS. 6 and 7).

FIG. 8

Figure 8:
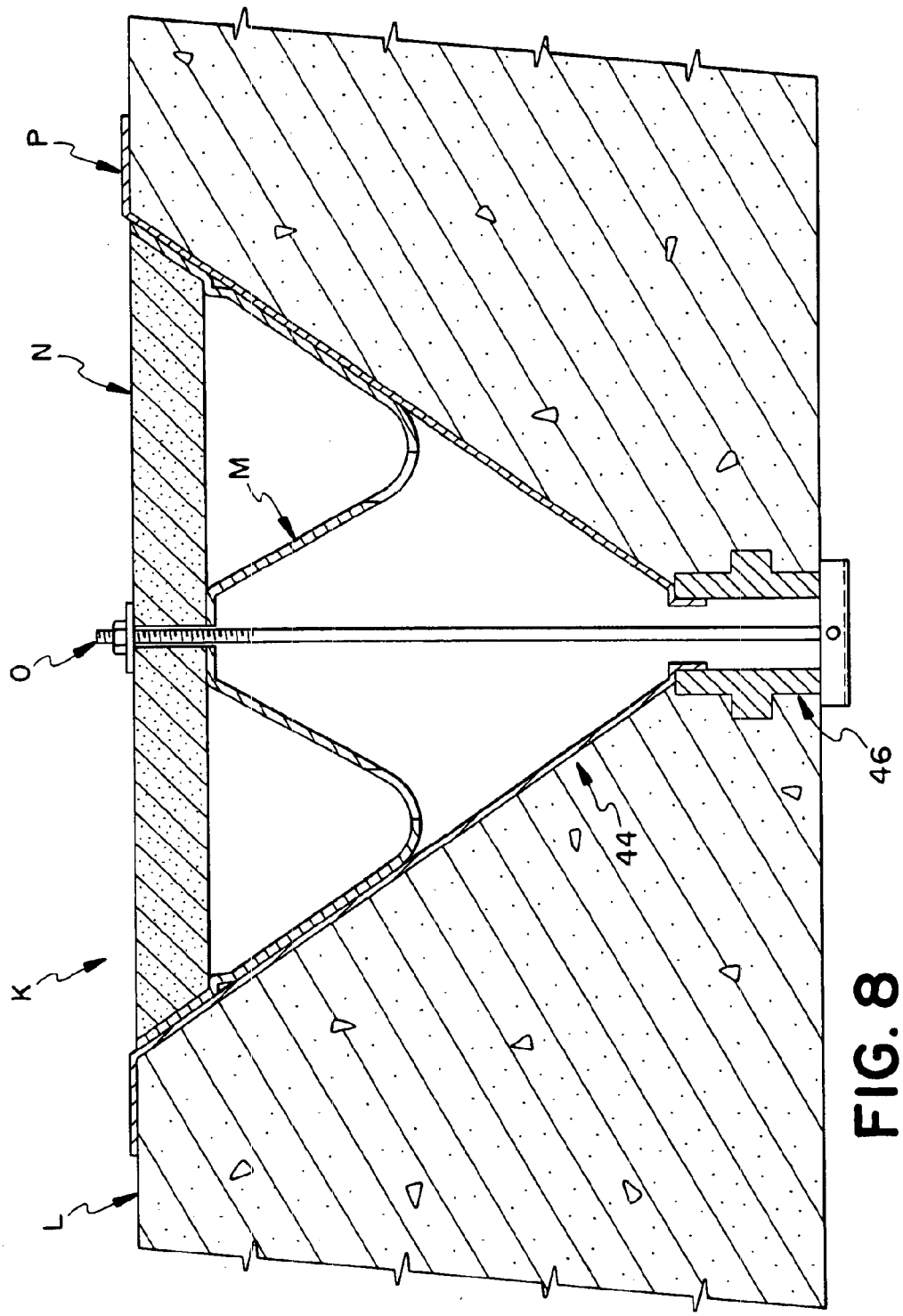
FIG. 8 is a cross-sectional view of a third preferred embodiment of the present invention.

Referring to FIG. 8, another alternative arrangements will now be described. This embodiment is very similar to that depicted in FIGS. 1 to 3. The underdrain system K includes a false bottom underdrain structure L. The false bottom filter underdrain structure L is preferably formed of concrete and includes a plurality of hoppers 44 (only one of which is shown). The false bottom underdrain structure L can either be of the pre-cast or monolithic construction. Where the false bottom underdrain structure L is of the pre-cast type, the underdrain structure will typically include one or more underdrain blocks. The number of underdrain blocks will vary depending on the size of a given filter.

The underdrain system K further includes a plurality of optional distribution inserts M (only one of which is shown), a plurality of porous plates N (only one of which is shown), a plurality of anchor assemblies O (only one of which is shown) and a plurality of plastic liners P (only one of which is shown). Preferably, there is one distribution insert M, one porous plate N, one anchor assembly O and one plastic liner P for each depression in the filter underdrain structure L. Thimble 46 is disposed in the lowermost portion of the hopper 44. The differences between this embodiment and that depicted in FIGS. 1 to 3 lies in the presence of a plastic liner P disposed between the insert M and the hopper 44. The plastic liner P as previously explained can be used when the walls of the hopper 44 have significantly deteriorated.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

We claim:

1. An underdrain system, comprising:
   (a) a bottom having a plurality of depressions formed therein;
   (b) a porous plate, said porous plate being operably associated with at least one of said plurality of depressions;
   (c) a removable anchor assembly for removably anchoring said porous plate to said bottom, at least a portion of said removable anchor assembly extends through said porous plate; and,
   (d) an insert positioned between said porous plate and a corresponding depression, said insert having a plurality of openings for distributing the flow of fluid passing through the insert.

2. An underdrain system as set forth in claim 1, wherein:
   (a) at least a portion of said porous plate is disposed in a corresponding depression.

3. An underdrain system as set forth in claim 1, wherein:
   (a) said removable anchor assembly includes a first member and a second member, said first member is moveable between a first position and a second position relative to said second member.

4. An underdrain system as set forth in claim 1, wherein:
   (a) said removable anchor assembly includes a first member and a second member, said first member being pivotally connected to said second member.

5. An underdrain system as set forth in claim 1, wherein:
   (a) at least a portion of said insert extends into a corresponding depression.

6. An underdrain system as set forth in claim 1, wherein:
   (a) said depression is cone shaped.

7. An underdrain system as set forth in claim 1, wherein:
   (a) a fluid tight seal is formed between said porous plate and said insert.

8. An underdrain system, comprising:
(a) a bottom having a plurality of depressions formed therein:
(b) a porous plate, said porous plate being operably associated with at least one of said plurality of depressions;
(c) a removable anchor for removably anchoring said porous plate to said bottom, at least a first portion of said removable anchor being moveable between a first position and a second position; and,
(d) said removable anchor includes a first member and a second member, said first member has a body and a plurality of legs extending upwardly from said body.

9. An underdrain system as set forth in claim 8, wherein:
(a) said first member is moveable between a first position and a second position relative to said second member.

10. An underdrain system as set forth in claim 9, wherein:
(a) said first member is pivotally connected to said second member.

11. An underdrain system as set forth in claim 8, wherein:
(a) said first member has a lower surface, said lower surface includes an opening for permitting fluid to pass therethrough.

12. An underdrain system as set forth in claim 8, wherein:
said first member is substantially u-shaped.

13. An underdrain system, comprising:
(a) a bottom having a plurality of depressions formed therein;
(b) a particle retaining plate, said plate being operably associated with at least one of said plurality of depressions, said plate having a plurality of openings for permitting fluid to pass therethrough;
(c) an anchor assembly for anchoring said plate to said bottom; and,
d) an insert operably disposed between said plate and a corresponding depression to distribute the flow of fluid.

14. An underdrain system as set forth in claim 13, wherein:
(a) said anchor assembly removably anchors said plate to said bottom.

15. An underdrain system as set forth in claim 13, wherein:
at least a portion of said anchor assembly extends into one of said plurality of depressions in said bottom.

16. An underdrain system as set forth in claim 13, wherein:
(a) said insert has a plurality of openings formed therein for distributing the flow of fluid.

17. An underdrain system, comprising:
(a) a bottom having an upper surface and a lower surface, said bottom further having a plurality of depressions formed therein, said depressions extending between said upper surface and said lower surface;
(b) a porous plate, said porous plate being operably associated with at least one of said plurality of depressions;
(c) an anchor assembly for anchoring said porous plate to said bottom; and,
(d) an insert operably disposed between said porous plate and a corresponding depression to distribute the flow of fluid.

18. An underdrain system as set forth in claim 17, wherein:
(a) said anchor assembly has a first member and a second member, said first member being moveable between a first position and a second position.

19. An anchor assembly as forth in claim 18, wherein:
(a) said first member is disposed below said lower surface of said bottom.

20. An underdrain system as set forth in claim 17, wherein:
(a) said insert has a plurality of openings formed therein for distributing the flow of fluid.

* * * * *